(12) United States Patent
Gassmann et al.

(10) Patent No.: US 8,739,953 B2
(45) Date of Patent: Jun. 3, 2014

(54) ACTUATING ASSEMBLY

(75) Inventors: Theodor Gassmann, Siegburg (DE);
Michael Schwekutsch, Wermelskirchen (DE); Mark Schmidt, Königswinter (DE); Holger Seidl, Seigburg (DE)

(73) Assignee: GKN Driveline International GmbH, Lohmar (DE)

( * ) Notice: Subject to any disclaimer, the term of this patent is extended or adjusted under 35 U.S.C. 154(b) by 247 days.

(21) Appl. No.: 13/145,069

(22) PCT Filed: Jan. 19, 2010

(86) PCT No.: PCT/EP2010/000277
§ 371 (c)(1),
(2), (4) Date: Jul. 18, 2011

(87) PCT Pub. No.: WO2010/081743
PCT Pub. Date: Jul. 22, 2010

(65) Prior Publication Data
US 2011/0284337 A1    Nov. 24, 2011

(30) Foreign Application Priority Data
Jan. 19, 2009    (DE) .......................... 10 2009 005 410

(51) Int. Cl.
*F16D 48/02*    (2006.01)
*B60K 23/08*    (2006.01)

(52) U.S. Cl.
USPC .................................. 192/85.63; 192/48.601

(58) Field of Classification Search
USPC ........................................................ 60/413
See application file for complete search history.

(56) References Cited

U.S. PATENT DOCUMENTS

| | | | | |
|---|---|---|---|---|
| 6,530,463 | B1 * | 3/2003 | Beck .......................... | 192/48.601 |
| 7,617,919 | B2 | 11/2009 | Nett et al. | |
| 7,832,540 | B2 | 11/2010 | Quehenberger et al. | |
| 2007/0170030 | A1 * | 7/2007 | Yamazaki et al. .............. | 192/35 |
| 2010/0294614 | A1 | 11/2010 | Gassmann | |

FOREIGN PATENT DOCUMENTS

| DE | 10 2008 037886 A1 | 2/2010 |
|---|---|---|
| WO | WO-2005/064187 A1 | 7/2005 |
| WO | WO-2006/007086 A1 | 1/2006 |

(Continued)

OTHER PUBLICATIONS

PCT International Search Report dated May 3, 2010 for PCT/EP2010/000277.

(Continued)

*Primary Examiner* — Rodney Bonck
*Assistant Examiner* — Lillian Nguyen
(74) *Attorney, Agent, or Firm* — Bejin, VanOphem & Bieneman PLC

(57) ABSTRACT

An actuating assembly for connecting a driving axle in the driveline of a motor vehicle is disclosed. The actuating assembly comprises a pump for generating a hydraulic pressure; a pressure accumulator which can be filled by the pump with a hydraulic fluid for generating a pre-pressure; a first hydraulic actuating unit for actuating a first coupling; a second hydraulic actuating unit for actuating a second coupling; wherein at least one of the two first or second hydraulic actuating units can be loaded by the pressure accumulator with hydraulic pressure and, after the pressure accumulator has been at least partially emptied, can be additionally loaded by the pump, wherein the associated first or second coupling can be actuated in the closing sense. Furthermore, a drive assembly having an inventive actuating assembly is also disclosed.

25 Claims, 10 Drawing Sheets

(56) References Cited

FOREIGN PATENT DOCUMENTS

WO     WO 2006128637 A1 * 12/2006
WO     WO 2010017882 A1 * 2/2010

OTHER PUBLICATIONS

English Translation of PCT International Search Report of Patentability dated Jul. 19, 2011 for PCT/EP2010/000277.

* cited by examiner

US 8,739,953 B2

ACTUATING ASSEMBLY

CROSS REFERENCE TO RELATED APPLICATIONS

This application is a National Phase of International Application No. PCT/EP2010/000277, filed on Jan. 19, 2010, which claims priority to German Application No. 10 2009 005 410.3 filed on Jan. 19, 2009, which applications are hereby incorporated by reference in their entirety.

TECHNICAL FIELD

The disclosure relates to a hydraulic assembly for actuating a coupling in the driveline of a motor vehicle. More particularly, the hydraulic assembly can be used for actuating a hang-on coupling for optionally connecting a secondary driving axle to a permanently driven primary driving axle. Such drive systems which permit a change-over from a two-wheel drive to a four-wheel drive are also referred to as on-demand or hang-on systems.

BACKGROUND

From WO 2006/007086 A1 there is known a torque transmitting mechanism with a pump, a pressure store and a plurality of hydraulically actuatable couplings. The pressure store is filled by a pump. The couplings can be loaded with hydraulic pressure from the pressure store by operating the respective valves.

From WO 2006/128637 A1 there is known a drive unit with two friction couplings with a hydraulic actuator. According to one embodiment it is proposed that the two friction couplings are connected to one another via a short-circuit line with a safety valve. If the pressure in the first coupling drops, the hydraulic fluid can flow to the second coupling, with the first coupling being opened and the second coupling being closed.

From DE 2007 063 360 there is known a hydraulic assembly for one or several force-actuated setting units. The hydraulic assembly comprises a pump which is driven by a driveshaft of the motor vehicle and which generates a hydraulic pressure for actuating a piston-cylinder unit. The piston-cylinder unit serves to actuate a friction coupling by means of which it is possible to connect a secondary driving axle in the driveline of the motor vehicle. The hydraulic assembly can comprise a pressure accumulator which can be loaded by the pump and which can generate a relatively large volume flow for loading the piston-cylinder unit.

From DE 10 2008 037 886 there is known a drive assembly for a multi-axle driven motor vehicle. The drive assembly comprises a transfer case which distributes a torque introduced by an engine/motor to a first driving axle and to a second driving axle; it also comprises a propeller shaft which is arranged in the torque flow between the transfer case and the second driving axle. There is provided a first coupling at the first end of the propeller shaft and a second coupling at the second end of the propeller shaft. In the closed condition of the two couplings, torque is transmitted to the optionally connectable second driving axle. In the open condition of the two couplings, the propeller shaft with all the rotating components is disconnected from the engine and from the second driving axle, so that the propeller shaft is stationary.

DE 10 2004 033 439 B4 proposes a driveline for a motor vehicle with a friction coupling for transmitting torque and with an actuating assembly for actuating the friction coupling. The actuating assembly comprises a first pump which is suitable for quickly closing the friction coupling with a small amount of force, and a second pump which is designed for actuating the friction coupling with a large amount of force and a short stroke. The two pumps comprise different hydraulic ratios.

SUMMARY

An actuating assembly for optionally connecting a driving axle in the driveline of a motor vehicle is disclosed herein. The actuating assembly comprises a pump for generating a hydraulic pressure; a pressure accumulator which can be filled by the pump with a hydraulic fluid for generating a pre-pressure; a first hydraulic actuating unit for actuating a first coupling in the driveline of the motor vehicle; and a second hydraulic actuating unit for actuating a second coupling in the driveline of the motor vehicle. At least one of the two first or second hydraulic actuating units can be loaded by the pressure accumulator with hydraulic pressure and, after the pressure accumulator has been at least partially emptied, can be additionally loaded by the pump, wherein the associated first or second coupling is actuated in the closing sense. More particularly, the pump is provided in the form of a bi-directional pump which can be actuated in a first conveying direction and an opposed second conveying direction. It is also proposed that when actuating the pump in the first conveying direction, the pressure store can be filled with hydraulic fluid, whereas if the pump is actuated in the second conveying direction, at least one of the two couplings can be actuated in the closing sense.

The advantage of the actuating assembly is that it meets the requirement of achieving a short switching time for connecting the secondary driveline, combined with a sensitive control of the torque to be transmitted to the secondary driving axle. The pressure accumulator is loaded by the pump, as a result of which there is generated a hydraulic pre-pressure. A respective switching operation, for example by means of a valve, ensures that hydraulic fluid is pumped from the pressure chamber into the hydraulic system, with one or both actuating units being loaded. The operation of emptying the pressure accumulator takes place abruptly, i.e. within a short time a relatively large volume flow is pressed into the hydraulic system for actuating the first and, respectively, the second coupling. Thus, at least one of the two actuating units is activated, and in one embodiment, both actuating units. The actuating units according to the first solution are designed such that, if loaded by hydraulic pressure, the associated coupling is loaded in the closing sense. A further advantage of the present actuating assembly is that it is released if the hydraulic system fails, which is also referred to as a fail-safe function.

The volume to be conveyed by the pressure accumulator is preferably such that in the completely emptied condition, the coupling clearance in the at least one coupling is at least largely bridged. "Coupling clearance" shall be understood as the path by which the two relatively rotatable coupling parts can be displaced relative to one another without any torque being transmitted between the two coupling parts. More particularly, the pressure accumulator is dimensioned in such a way that the volume flow is sufficient for actuating the first hydraulic actuating unit completely and for actuating the second hydraulic actuating unit to such an extent that the coupling clearance of the second coupling can be reduced to a specified amount. The pressure store ensures in an advantageous way that said coupling clearance is pressed relatively quickly out of the respective coupling. After the pressure accumulator has been emptied, a sensitive control operation can then take over the required setting of torque by controlling accordingly the associated actuating unit.

According to one exemplary embodiment, both the first and the second hydraulic actuating unit can be loaded by the pressure accumulator with hydraulic pressure. In this way it is ensured that both couplings are switched approximately simultaneously. The two actuating units are loaded as a function of the driving conditions by accordingly controlling valves. Generally speaking it is conceivable that both couplings are switched simultaneously. Depending on the design of the couplings, it is also conceivable that one of the two actuating units is operated with a short lead time in order to ensure that the associated coupling, in terms of time, is closed before the other one is closed. After the pressure accumulator has been emptied completely, the hydraulic actuating unit which defines the amount of torque transmitted to the secondary driving axle is loaded by the pump with hydraulic pressure as required. The pump permits a sensitive control of the actuating unit and thus also the required setting of the torque transmitted to the secondary axle. This has an advantageous effect on the driving stability of the motor vehicle.

A second arrangement includes providing an activating assembly for optionally connecting a driving axle in the driveline of a motor vehicle. This exemplary arrangement comprises a pump for generating a hydraulic pressure and a first hydraulic actuating unit which can be loaded by the pump with a hydraulic pressure against a counter force. A pre-pressure can be stored in the first hydraulic actuating unit, by which the pre-pressure of a first coupling in the driveline of the motor vehicle is held in an open position. The second arrangement further comprises a second hydraulic actuating unit which can be loaded with the pre-pressure stored in the first hydraulic actuating unit and which can also be loaded by the pump with hydraulic pressure, wherein by loading the second hydraulic actuating unit, a second coupling in the driveline of the motor vehicle is closed for transmitting torque. The counter force which acts against the hydraulic pressure of the pump is may be generated by an resilient element, for example a spring.

A special characteristic of the second solution includes that the first hydraulic actuating unit fulfils two functions, i.e. it loads the first coupling and it loads the second coupling. This is achieved in that the first actuating unit is able to store hydraulic pressure and, thus, can also be referred to as an actuation pressure accumulator unit. Because of the pump, there is generated a hydraulic pressure in the first actuating unit, by which hydraulic pressure, the first coupling is held in the open position. In the case of driving conditions in which the secondary driving axle is to be optionally connected, the pre-pressure is used for loading the second hydraulic actuating unit. Thereby, both the first and the second coupling are closed. An advantage is that due to the hydraulic pre-pressure of the spring-loaded first actuating unit, the second actuating unit is closed very quickly. This is achieved by a relatively large volume flow. The pump can then ensure a sensitive control of the torque to be transmitted by the second coupling.

According to one exemplary embodiment, the first and the second hydraulic actuating unit are designed in such a way that the maximum volume flow conveyable from the first hydraulic actuating unit to the second hydraulic actuating unit is large enough for ensuring that the coupling clearance of the second coupling can be at least largely bridged. This is advantageous in that the coupling clearance can be bridged quickly by the relatively large volume flow, so that the torque to be transmitted to the secondary driving axle can be set quickly. More particularly, it is proposed that the maximum actuation stroke which can be generated at the second hydraulic actuating unit by emptying the first actuating unit, is adapted to the coupling clearance of the second coupling, more particularly that it approximately corresponds to the coupling clearance. In this way, the second coupling can be connected particularly quickly. A sensitive requirements-based control of the coupling moment, can then be set by the pump.

The pump may be driven by an electric motor, i.e. by setting the amperage, the volume flow to be conveyed by the pump is continuously controllable. The pump is may be provided in the form of a two-way pump. When the pump is actuated in a first conveying direction, the first hydraulic actuating unit is loaded, with the second hydraulic actuating unit preferably remaining unloaded or being emptied in the opening sense of the second coupling. In this way, it is achieved that in the first conveying direction, both couplings are opened. When the pump is actuated in the opposed second conveying direction, the second hydraulic actuating unit is loaded, with the first hydraulic actuating unit remaining unloaded. That is in the second conveying direction only the second actuating unit and thus the associated second coupling is actuated. This makes it possible for the torque to be transmitted to the secondary driving axle to be set sensitively. Said pump embodiment, more particularly with two conveying directions and a continuously variable control analogously also applies to the first solution. If conveying takes place in the first conveying direction, the pressure accumulator is loaded, with the first actuating unit preferably being emptied. If conveying takes place in the second conveying direction, the second hydraulic actuating unit is loaded.

According to the second arrangement, the first hydraulic actuating unit and the second hydraulic actuating unit may be connected to one another via a connecting channel which comprises at least one valve for opening and closing purposes. By opening the at least one valve, hydraulic fluid is conveyed from the first hydraulic actuating unit to the second hydraulic actuating unit.

In a first embodiment, a multi-way valve is arranged between the pump and the two actuating units, which multi-way valve alternately connects the first actuating unit to the pump and to the second actuating unit. Furthermore, between the pump and the first actuating unit there is arranged a non-return valve which prevents the return of the oil out of the first actuating unit. As a result, the pump can be disconnected after the first actuating unit has been filled, without the first actuating unit being emptied. In a second embodiment, a first valve is arranged between the pump and the first actuating unit and a second valve is arranged between the pump and the second actuating unit. In both embodiments, two further non-return valves connect the two pump ends to the reservoir so that the pump can suck oil out of the reservoir in both directions of rotation. The valves are controlled for example by an electronic control unit which controls the driving dynamics of the motor vehicle. The input signal for the control unit can be the pressure measured in the conduit leading to the second actuating unit. For this purpose, there is provided a pressure sensor.

According to an exemplary embodiment, which applies to both the above-mentioned arrangements, the first hydraulic actuating unit comprises a piston-cylinder unit which has a pressure storing function. For this purpose, it is preferably proposed that the first hydraulic actuating unit comprises a first spring which loads the piston of the piston-cylinder unit against the pressure force of the pump. The first coupling is loaded by the first spring in the closing direction. By generating a hydraulic pressure, the piston is moved towards the spring, so that the spring pretensions the piston. By opening a valve, the piston is pressed by the spring in the closing direction of the first coupling, with the chamber of the piston-cylinder unit being emptied abruptly. In the process, the first coupling is closed. The hydraulic fluid contained in the chamber is conveyed to the second actuating unit, so that the second coupling is closed at least partially.

According to a further embodiment, the first hydraulic actuating unit comprises a second spring which loads the piston of the piston-cylinder unit against the pressure force of the pump, with the second spring comprising a lower spring stiffness than the first spring, the advantage being that the first actuating unit is loaded in a stepped way. First, the piston is moved by the first spring by a higher spring force. After the first spring has become untensioned, i.e. has come to rest against a stop, the piston is moved further by the second spring, and that by a lower spring force. As a result of this design, the second actuating unit is initially rapidly loaded along a long distance. There then takes place a gentler loading process, so that the contact point of the second coupling, from which point onwards torque is transmitted, is approached more sensitively.

According to a first possibility, the second spring can be axially supported on a supporting face of the piston-cylinder unit, i.e. the first and the second spring are set in parallel. In this case, the spring forces are added up while the tension of the first spring is being released. According to a second possibility, the second spring is at least indirectly axially supported on the first spring, i.e. the two springs are connected in series. In this case, the piston is loaded with the maximum spring force of the first spring. In both cases, the final stroke effected by the second spring takes place with the spring force of the second spring.

The first coupling may be provided in the form of a locking coupling, with the locking coupling being switchable between an open position in which no torque can be transmitted and a closed position in which the full amount of torque is transmitted. As examples for a locking coupling, a toothed clutch or a dog clutch are named. To achieve a soft switching behaviour, it is advantageous if the rotational speeds of the two coupling parts are synchronised before the switching operation. To that extent, the locking coupling can also be provided in the form of a so-called synchronisation locking unit.

The second coupling is may be provided in the form of a friction coupling, with the torque transmittable by the friction coupling being variably controllable by the pump. The switching sequence is such that first the locking coupling is switched, and subsequently the transmission of torque is set by the friction coupling. The coupling moment of the friction coupling can be continuously adjusted.

According to a possible further embodiment, which also applies to both the above-mentioned arrangements, there is provided a third hydraulic actuating unit for actuating a third coupling. The third coupling, more particularly, is provided in the form of a locking coupling which serves to lock a differential drive.

A driving assembly for a motor vehicle is also provided with a permanently driven first driving axle and an optionally connectable second driving axle, wherein a driveline for driving the second driving axle comprises a first coupling and a second coupling, and wherein for actuating the first and the second coupling there is provided an actuating assembly according to one of the above-mentioned embodiments.

An advantage of the disclosed drive assembly includes in that, if necessary, it can quickly be switched from a two-wheel drive mode to a four-wheel drive mode. The advantage of using two couplings in the driveline for the optionally connectable driving axle is that all the parts arranged in the torque flow between the two couplings are stationary when the couplings are open. This has an advantageous effect on the performance losses and thus on the fuel consumption.

According to a first embodiment, the permanently driven driving axle is the front axle and the optionally connectable driving axle is the rear axle of the motor vehicle. By way of example, the second coupling can be arranged coaxially relative to the axis of rotation of the rear axle differential, which is particularly advantageous in that the angle drive for driving the rear axle differential can stand still when the rear axle is disconnected. Alternatively, the second coupling can also be arranged coaxially to a propeller shaft or to a shaft portion of the propeller shaft of the motor vehicle. The first coupling may be arranged in the torque flow between a front axle differential and an angle drive which serves to branch off the torque from the front axle to the propeller shaft.

According to a second embodiment it is also conceivable that the permanently driven driving axle is the rear axle and that the front axle, if required, is additionally driven by the actuating assembly.

Furthermore, a method of optionally connecting a driving axle in the driveline of a motor vehicle by an actuating assembly is also disclosed, wherein the actuating assembly comprises the following components:

a pump for generating a hydraulic pressure; a pressure accumulator which can be filled by the pump with a hydraulic fluid for generating a pre-pressure; a first hydraulic actuating unit for actuating a first coupling in the driveline of the motor vehicle, wherein the first hydraulic actuating unit can be hydraulically loaded by the pressure accumulator or forms the pressure accumulator; and a second hydraulic actuating unit for actuating a second coupling in the driveline of the motor vehicle, wherein the second hydraulic actuating unit can be hydraulically loaded by the pressure accumulator; with the following process stages:

filling the pressure accumulator with hydraulic fluid by the pump, wherein a hydraulic pre-pressure is generated, and at least partially emptying the pressure accumulator, wherein the first coupling is completely closed for the purpose of transmitting a torque and the second coupling is at least partially closed.

This process applies to both the above-mentioned arrangements and the exemplary embodiments of same. Thereby is achieved a short switching time because the stored pre-pressure in the pressure store is used both for closing the first coupling and also for at least partially closing the second coupling. It goes without saying that all the embodiments and actuating methods described in connection with the above-mentioned actuating assemblies can be used in the process.

It is proposed according to a first embodiment that the first and the second friction coupling—when loading the associated actuating unit with hydraulic fluid from the pressure accumulator—are actuated in the closing sense. According to a second embodiment wherein the pressure accumulator forms part of the first hydraulic actuating unit, the first coupling, when pressurising the associated first actuating unit, is opened against a spring force. By releasing the hydraulic pressure out of the first actuating unit, hydraulic fluid flows from the first actuating unit to the second actuating unit, with the first and the second coupling being closed.

According to an exemplary embodiment, it is proposed according to a further process stage that, after the pressure store has been completely emptied, the second hydraulic actuating unit for actuating the second coupling is loaded with hydraulic pressure by the pump, as required. As already described, this achieves a sensitive coupling control and thus accurate metering of the torque.

The pump may be configured to work in two directions, with the pressure accumulator being filled by actuating the pump in a first conveying direction, with the second hydraulic actuating unit being loaded by actuating the pump in an opposed second conveying direction.

BRIEF DESCRIPTION OF THE DRAWINGS

Exemplary embodiments of the disclosed are illustrated in the drawings and will be described below with reference to the Figures.

DETAILED DESCRIPTION

Figure 1:
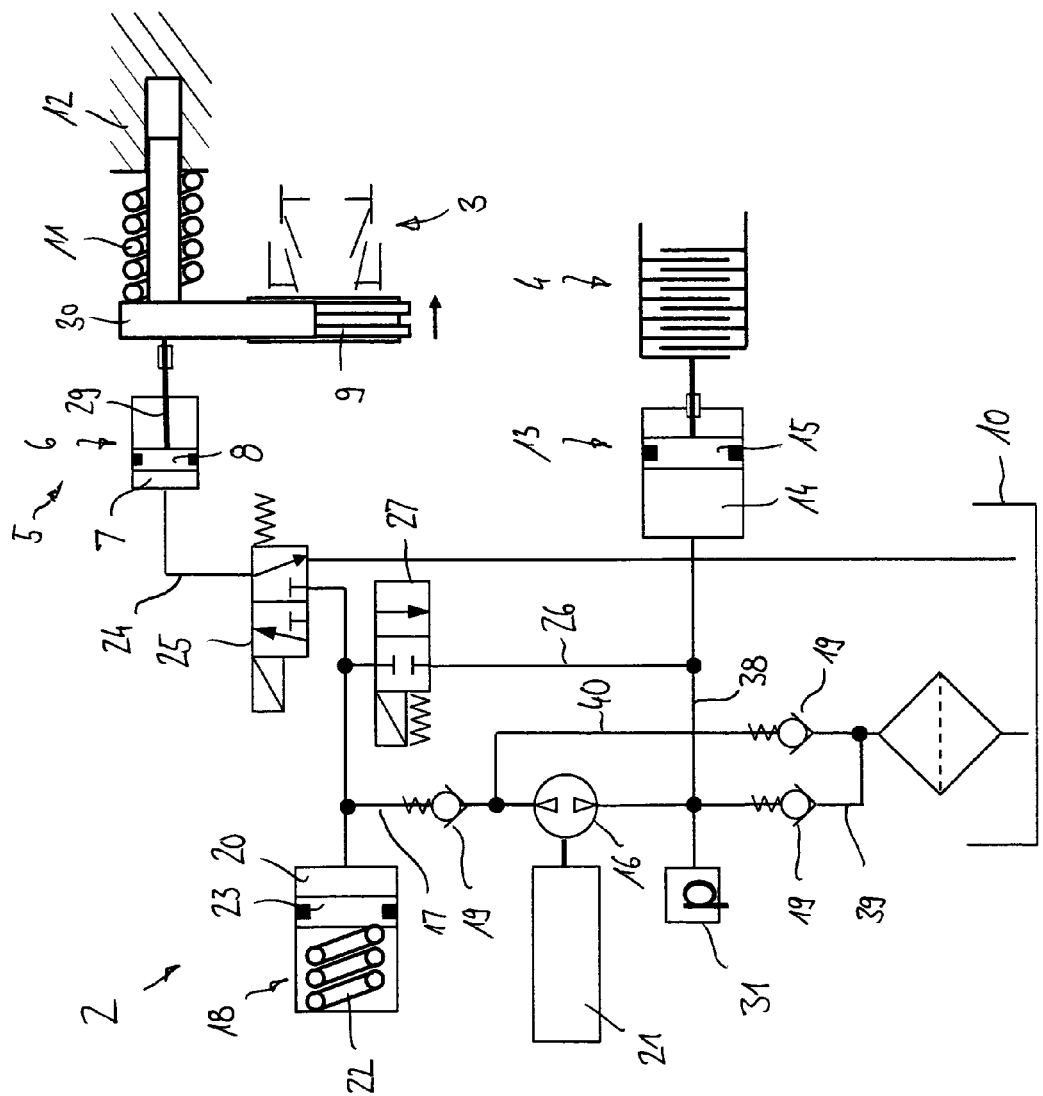
FIG. 1 shows an inventive hydraulic actuating assembly in a first embodiment.

FIG. 1 shows an inventive hydraulic actuating assembly 2 for actuating a first coupling 3 and a second coupling 4 in the driveline of a motor vehicle. The first coupling 3 and the second coupling 4 serve for optionally connecting a secondary driving axle (not illustrated here) to a permanently driven primary driving axle. By opening at least one of the two couplings 3, 4, the transmission of torque to the secondary driving axle is interrupted. By opening both couplings 3, 4, a portion of the driveline positioned in the torque path between the two couplings is disconnected from the permanently driven first driving axle and from the optionally connectable second driving axle. The driveline portion positioned between the two driving axles is thus standing still, so that any friction losses which are generated due to rotational movements of all rotating components, are reduced.

The hydraulic assembly 2 comprises a first hydraulic actuating unit 5 which may comprise a piston-cylinder unit with a hydraulic chamber 7 and a setting piston 8 displaceably arranged in the hydraulic chamber 7. The setting piston 8 is sealed relative to the cylindrical wall by an annular seal arranged in a circumferential groove of the setting piston 8 and serves to actuate a switching muff 9 which can actuate the first coupling 3. The switching muff 9 can be transferred into a first switching position in which the first coupling 3 is completely open, so that no torque is transmitted, and into a second switching position in which the first coupling 3 is fully closed for transmitting torque. In the present illustration, the loading of the first coupling 3 in the closing sense is indicated by an arrow. The switching muff 9 is loaded by a first spring 11 against the actuation force of the piston-cylinder unit 6 which is axially supported relative to a stationary component 12. The stationary component 12 can for example be a drive housing of an angle drive which is also referred to as power transfer unit or power take-off unit (PTU).

Furthermore, the hydraulic actuating assembly 2 comprises a second hydraulic actuating unit 13, which may also comprise a piston-cylinder unit with a hydraulic chamber 14 and a setting piston 15 displaceably arranged in the hydraulic chamber 14. The setting piston 15 which is sealed relative to the cylinder wall serves to actuate the second coupling 4. The second coupling 4 is preferably provided in the form of a friction coupling which can variably control the setting of the transmittable torque between an open position in which no torque is transmitted, and a closed position in which the maximum amount of torque is transmitted.

For generating a hydraulic pressure to act on to the first hydraulic actuating unit 5 and to the second hydraulic actuating unit 13, there is provided a hydraulic pump 16. The hydraulic pump 16 is connected via a connecting channel 17 to a pressure accumulator 18. In the connecting channel 17 there is provided a non-return valve 19. When the pump 16 is in the switched-off condition, the non-return valve 19 prevents hydraulic fluid from flowing out of the pressure accumulator 18 back to the second actuating unit 13 and into the reservoir 10, respectively. The pressure accumulator 18 comprises a accumulator chamber 20 which is connected to the pump 16 via the connecting channel 17. When the pump 16 is actuated, it conveys said hydraulic fluid into the accumulator chamber 20 against the force of the spring 27, with the pressure piston 23 axially movably arranged in the pressure accumulator 18 forming a system boundary between the accumulator chamber 20 and the receiving chamber for the spring 22. The pressure accumulator 18 makes available a larger volume of hydraulic fluid which, if required, can be used for loading the first and the second hydraulic actuating unit 5, 13, respectively. In this way, the couplings 3, 4 can be closed quickly and, more particularly, a coupling clearance at the couplings 3, 4 can be closed quickly. The large volume flow permits particularly short switching times of the first and the second coupling 3, 4, respectively.

The pressure accumulator 18 is connected to the first hydraulic actuating unit 5, via a connecting line 24 with a valve 25 being arranged in the line 24. The valve 25 is preferably provided in the form of a switchable valve. In a first position of the valve 25, the first hydraulic actuating unit 5 is connected to the pressure accumulator 18, so that the chamber 7 is filled with hydraulic fluid from the pressure accumulator 18. The piston 8 is moved against the force of the spring 11 for the purpose of closing the associated first coupling 3. In a second position of the valve 25, the chamber 7 is connected to the reservoir 10 for releasing the hydraulic fluid. In the second switched position, the first coupling 3 is loaded by the spring 11 in the opening sense, so that the torque flow to the second driving axle is interrupted, with hydraulic fluid escaping from the chamber 7 into the reservoir 10.

Furthermore, the pressure accumulator 18 is connected to the second hydraulic actuating unit 13 via a connecting line 26, with a further valve 27 being provided in the connecting line 26. The valve 27 may be provided in the form of a switchable valve which can be switched into a first position in which the second hydraulic actuating unit 13 is connected to the pressure accumulator 18, and into a second switched position in which the connecting line 26 is interrupted. When the valve 27 is switched into the first position, the chamber 14 of the second actuating unit 13 is filled from the pressure accumulator with hydraulic fluid until the pressure accumulator 18 is empty. The piston 15 then loads the second coupling 4 in the closing direction so that torque is transmitted to the secondary driving axle.

Switching the first valve 25 for actuating the first actuating unit 5 and the second valve 27 for actuating the second actuating unit 13 is effected, as required, by a controlling action carried out by an electronic control unit which controls the driving dynamics of the motor vehicle and the transmission of torque to the driving axles, respectively. For quickly connecting the secondary driveline, it is advantageous if the two valves 25, 27 are switched approximately simultaneously. Offsetting the switching operation in terms of time can be advantageous in order to ensure that first the one of the two couplings 3, 4 is securely closed before the other coupling 4, 3 is connected.

The volume to be conveyed by the pressure accumulator 18 may be calculated such that in the completely emptied condition, the first coupling 3 is completely closed and that the coupling clearance in the second coupling 4 is at least largely bridged. In this way it is ensured that by switching the valve 27, the coupling clearance is relatively quickly pressed out of the second coupling by the pressure accumulator 18. A particularly quick connection of the second driving axle is achieved if the volume flow out of the pressure accumulator 18 is sufficient for closing the first coupling 3 completely and for largely pressing the coupling clearance out of the second coupling 4. After the pressure accumulator 18 has been emptied, the pump 16 is additionally connected, which pump 16, by a sensitive control process, takes over the requirements-based setting of the torque.

The hydraulic pump can be driven by an electric motor 21, i.e. by setting the amperage, the volume to be conveyed by the pump 16 can be continuously variably controlled. The pump 16 is able to convey hydraulic fluid in two directions of rotation. The suction end of the pump 16 can be connected to the hydraulic chamber 14 of the second actuating 13 or to the reservoir 10. When the pump 16 is driven in the first direction of rotation, the hydraulic fluid contained in the hydraulic chamber 14 of the second actuating unit 13 is conveyed via the line 38 into the pressure accumulator 18. The second coupling 4 is opened completely, and in the pressure accumulator 18 there is built up a hydraulic pre-pressure. After the hydraulic chamber 14 has been emptied by pumping, further hydraulic fluid is conveyed out of the reservoir 10 through a second line 39 into the pressure accumulator 18. In the second line 39, there is provided a further non-return valve 19 and a filter. The first coupling 3 is held in the open position by the spring 11.

When the pump 16 is actuated in the opposed second direction of rotation, hydraulic fluid is sucked through the line 40 out of the reservoir 10 and conveyed through the line 38 to the second actuating unit 13, so that the second coupling 4 is loaded accordingly. By emptying the pressure accumulator 18, the first hydraulic actuating unit 5 has already been transferred into the closed position in which the first coupling 3 is closed for torque transmitting purposes. That is, in the second direction of rotation, only the second actuating unit 13 and thus the associated second coupling 4 is actuated. This measure allows a sensitive setting of the torque to be transmitted to the secondary driving axle. It is understood that the hydraulic pump could have any design; for example, it is possible to use vane pumps, gear pumps or piston pumps. However, it is important for the pump 16 to be able to convey in two directions. The electric motor 21 is controlled via an electronic control unit which controls the distribution of torque to the driving axles and wheels respectively. The input signal for the control unit is the pressure measured at the second actuating unit 13. For pressure measuring purposes, there is provided a pressure sensor 31 which is connected to the control unit.

Figure 2:
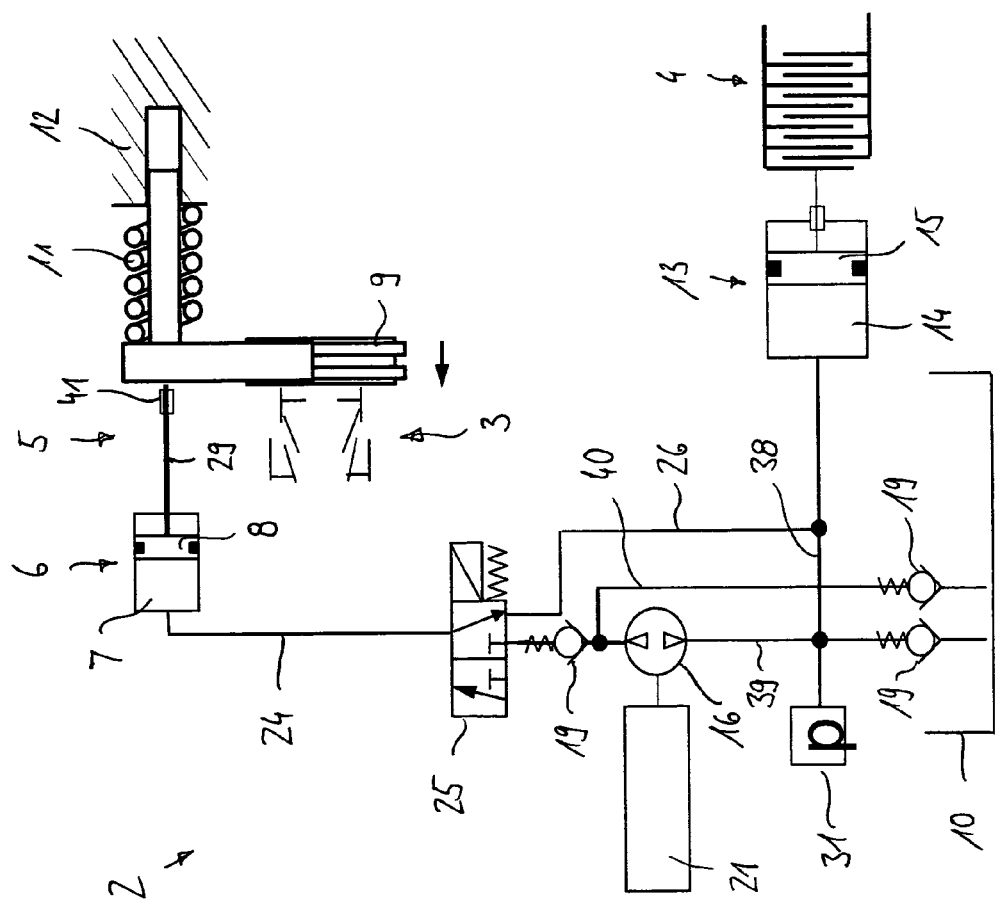
FIG. 2 shows an inventive hydraulic actuating assembly in a second embodiment.

FIG. 2 shows an inventive hydraulic actuating assembly in a second embodiment which largely corresponds to that shown in FIG. 1. To that extent, as far as common features are concerned, reference can be made to the above description, with identical components or components corresponding to one another having the same reference numbers.

A distinctive characteristic of the present embodiment is that the first hydraulic actuating unit 5, on the one hand, serves to actuate the first coupling 3 and, on the other hand, it serves as a pressure accumulator for generating a pre-pressure with which the second hydraulic actuating unit 13 can be loaded. By filling the hydraulic chamber 7 of the piston-cylinder unit 6, the piston 8 is moved towards the right, with the switching muff 9 being axially displaced against the force of the spring 11 in the opening sense of the first coupling 3. When the hydraulic chamber 7 is in the completely filled condition, the switching muff 9 is in its end position, with the first coupling 3, which is actuated by the switching muff 9, being fully opened, i.e. no torque is transmitted to the secondary driving axle.

For controlling the volume flows, a multi-way valve 25 is arranged between the pump 16 and the two actuating units 5, 13 in such a way that it connects the first actuating unit 5 either to the pump 16 or to the second actuating unit 13. Further, between the pump 16 and the first actuating unit 5, there is arranged a non-return valve 19 which prevents the return of the oil out of the first actuating unit 5.

For filling the hydraulic chamber 7 of the first hydraulic actuating unit 5, the multi-way valve 25 is transferred into a first switching position, so that the pump 16 is connected via the connecting channels 17 and 24 to the first hydraulic actuating unit 5, with the pump 16 being driven in a first direction of rotation. When the secondary second driving axle is to be connected, the multi-way valve 25 is transferred into the second switched position which is shown. The hydraulic chamber 7 of the first hydraulic actuating unit 5 is connected via the two connecting channels 24 and 26 to the hydraulic chamber 14 of the second hydraulic actuating unit 13. The piston 8 of the first actuating unit 5 is loaded by the spring 11 towards the left, as a result of which hydraulic fluid flows through the channels 24 and 26 into the hydraulic chamber 14 of the second actuating unit 13. At the same time, the switching muff is moved towards the left, as a result of which the first coupling 3 is fully closed.

The first coupling 3 may be provided in the form of a locking coupling. A particularly smooth switching process is ensured if the two coupling parts, which are rotatable relative to one another, are synchronised before being connected in a rotationally fixed way. To achieve this, it is possible to use a locking synchronised coupling as the first coupling 3. Alternatively, the first coupling 3 can also be provided in the form of a friction coupling, more particularly, a multi-plate friction coupling.

The second coupling 4 may be provided in the form of a friction coupling which comprises a certain axial clearance. Only after the clearance has been pressed out of the friction coupling, does it begin to transmit torque from the coupling input part to the coupling output part. The volume of the first hydraulic chamber 7 is adjusted to the volume of the second hydraulic chamber 14 such that, by completely emptying the first hydraulic chamber 7, the clearance is at least largely pressed out of the second coupling 4. In other words, when the multi-way valve 25 is in the second switched position, the first hydraulic actuating unit 5 acting as the pressure accumulator supports the process of closing the second coupling 4. With the help of the pressure accumulator, a relatively large volume flow is conveyed in a very short time, so that the clearance of the second coupling 4 is overcome relatively quickly. In this way, overall, there is achieved a short switching time for closing the second coupling 4.

While the hydraulic chamber 14 of the second hydraulic actuating unit 13 is being filled, with the respective piston 15 being loaded towards the friction coupling 4, the pump 16 starts running. In this case, the pump 16 rotates in the direction of rotation opposed to the direction of rotation when the first hydraulic actuating unit 5 is filled. After the first hydraulic chamber 7 has been emptied completely, the pump 16 takes over the process of conveying a hydraulic volume flow into the hydraulic chamber 14, with a sensitive control of the position of the piston 15 and thus of the amount of torque to be transmitted being set. The pump 16 is driven by the electric motor 21, so that, by setting the amperage, the volume to be conveyed by the pump 15 can be controlled in accordance with the respective requirements.

Figure 3:
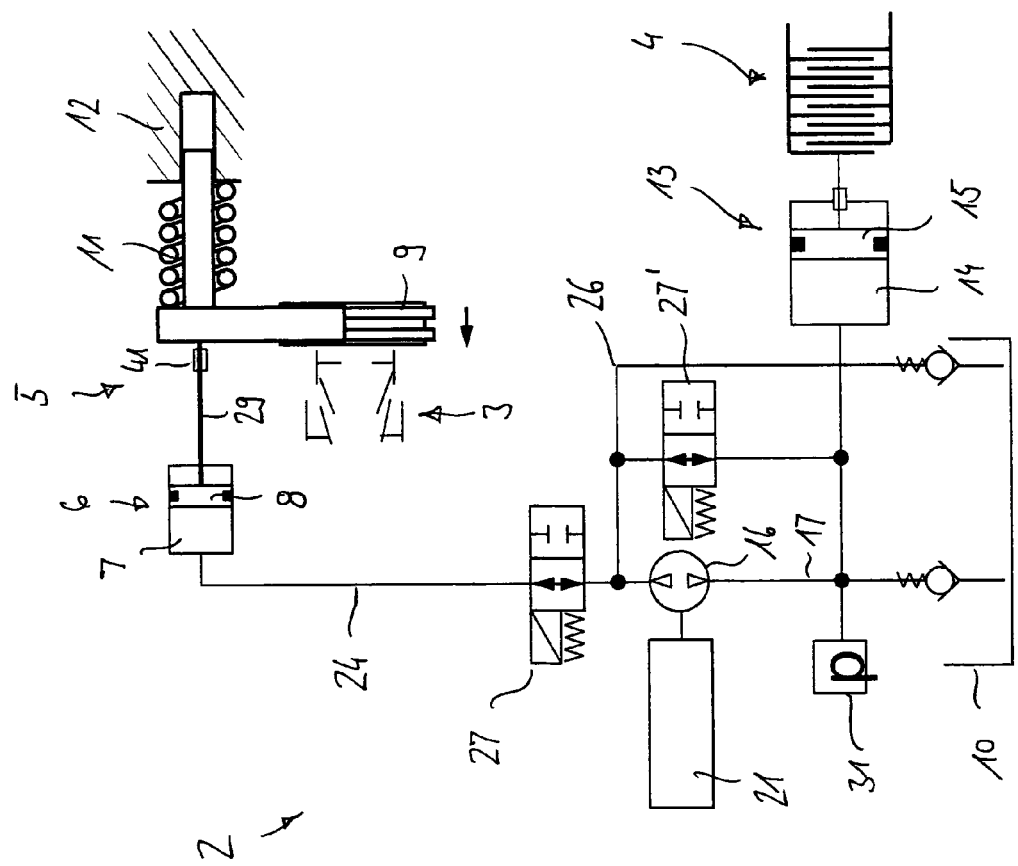
FIG. 3 shows an inventive hydraulic actuating assembly in a third embodiment.

FIG. 3 shows an inventive hydraulic actuating assembly in a third embodiment which largely corresponds to that shown in FIG. 2. To that extent, as far as common features are concerned, reference can be made to the above description, with identical components or components corresponding to one another having the same reference numbers.

The present embodiment differs in that the non-return valve 19 and the multi-way valve 25 of FIG. 2, in the present embodiment, are replaced by a first switching valve 27 and a second switching valve 27'. The switching valves 27,27' which may be of identical design, can each be transferred into a first switching position in which the associated actuating unit 5, 13 is connected to the pump 16, and into a second switching position in which the respective connecting channel 24, 26, is interrupted. The functioning mode is the same as in the embodiment according to FIG. 2.

Figure 4:
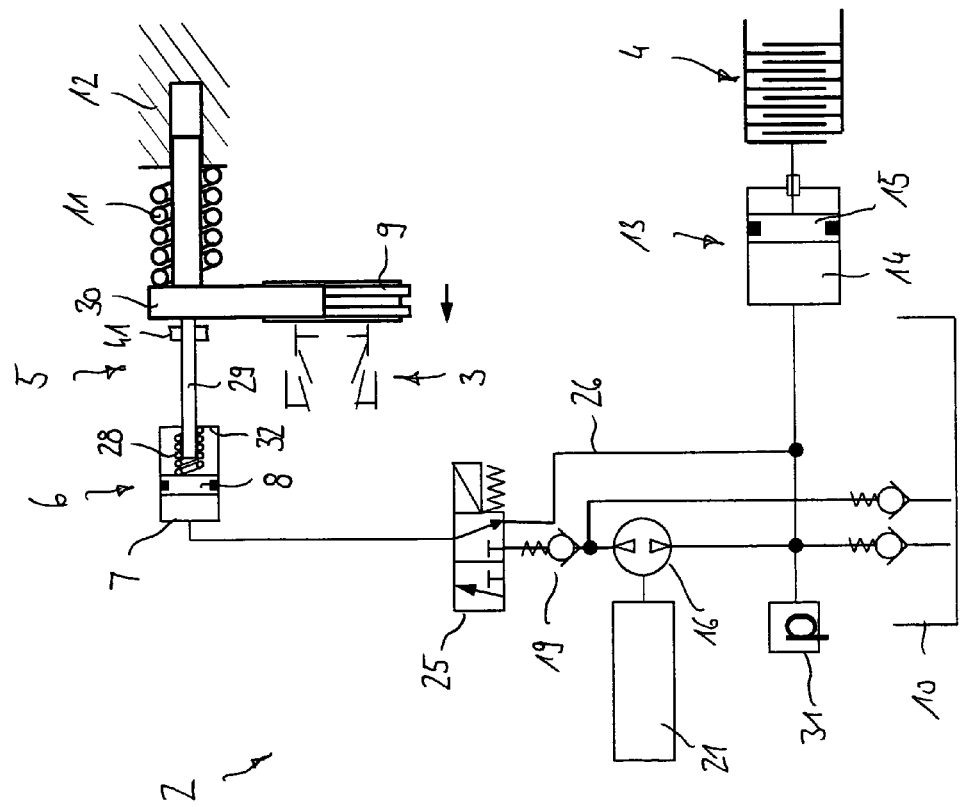
FIG. 4 shows an inventive hydraulic actuating assembly in a fourth embodiment.

FIG. 4 shows an inventive hydraulic actuating assembly in a fourth embodiment which largely corresponds to that shown in FIG. 2. To that extent, as far as common features are concerned, reference can be made to the above description, with identical components or components corresponding to one another having the same reference numbers.

A distinctive characteristic of the present embodiment includes that the first hydraulic actuating unit 5 comprises a second spring 28 which loads the piston 8 of the piston-cylinder unit 6 against the pressure force of the pump 16. The second spring 28 may be dimensioned in such a way that it comprises a lower spring stiffness than the first spring 11. It can be seen that the second spring 28 is axially supported on a supporting face 32 of the piston-cylinder unit 6. As a result, the first and the second spring 11, 28 are switched in parallel, so that the spring forces are added up while the first spring is untensioned.

The mode of functioning is such that by transferring the valve 25 into the switched position as illustrated, first the first spring 11 loads the switching muff 9 towards the piston-cylinder unit 6, with the rod 29 resting against the piston 8. When the switching muff 9 has reached an end position, which can be formed by an end stop 41 for example, the second spring 28 pushes the piston 8 further towards the chamber 7. This means that the second actuating unit 13 is loaded with hydraulic pressure in a stepped way, i.e. the second actuating unit 13 is initially quickly loaded along a long path; this is followed by a more gentle loading process, so that the point of contact of the second coupling 4, from which point onwards torque is transmitted, is approached more sensitively.

Figure 5:
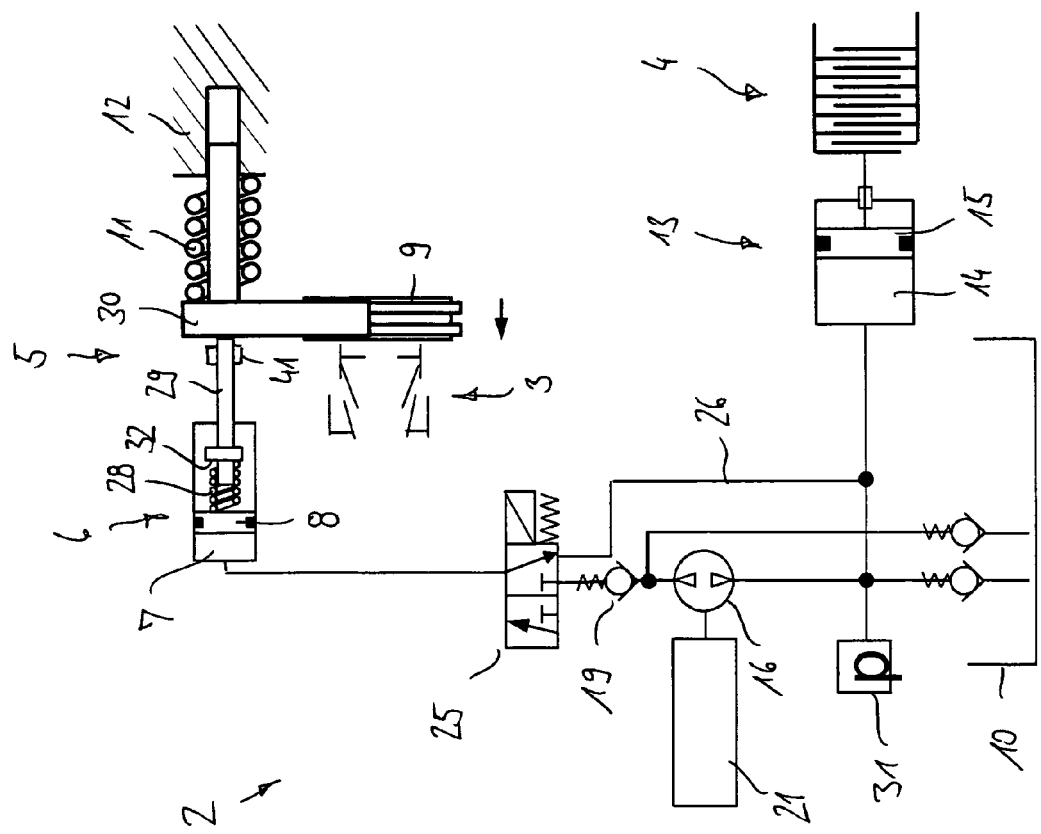
FIG. 5 shows an inventive hydraulic actuating assembly in a fifth embodiment.

FIG. 5 shows an inventive hydraulic actuating assembly in a fifth embodiment which largely corresponds to that shown in FIG. 4. To that extent, as far as common features are concerned, reference can be made to the above description, with identical components or components corresponding to one another having the same reference numbers.

The only difference as compared to the embodiment according to FIG. 4 is that in the present embodiment, the first and the second spring 11, 28 are connected in series instead of in parallel, with the second spring 28 being indirectly axially supported on the first spring 11. Being supported indirectly means in this connection that the second spring 28 is axially supported via a supporting face 32 of the piston rod 29 against the switching element 30 and via the latter against the first spring 11. This embodiment ensures that the piston 8 is loaded with the maximum spring force of the first spring 11. In both embodiments, the last stroke, which is effected by the second spring 28, is carried out with the spring force of the second spring 28.

Figure 6:
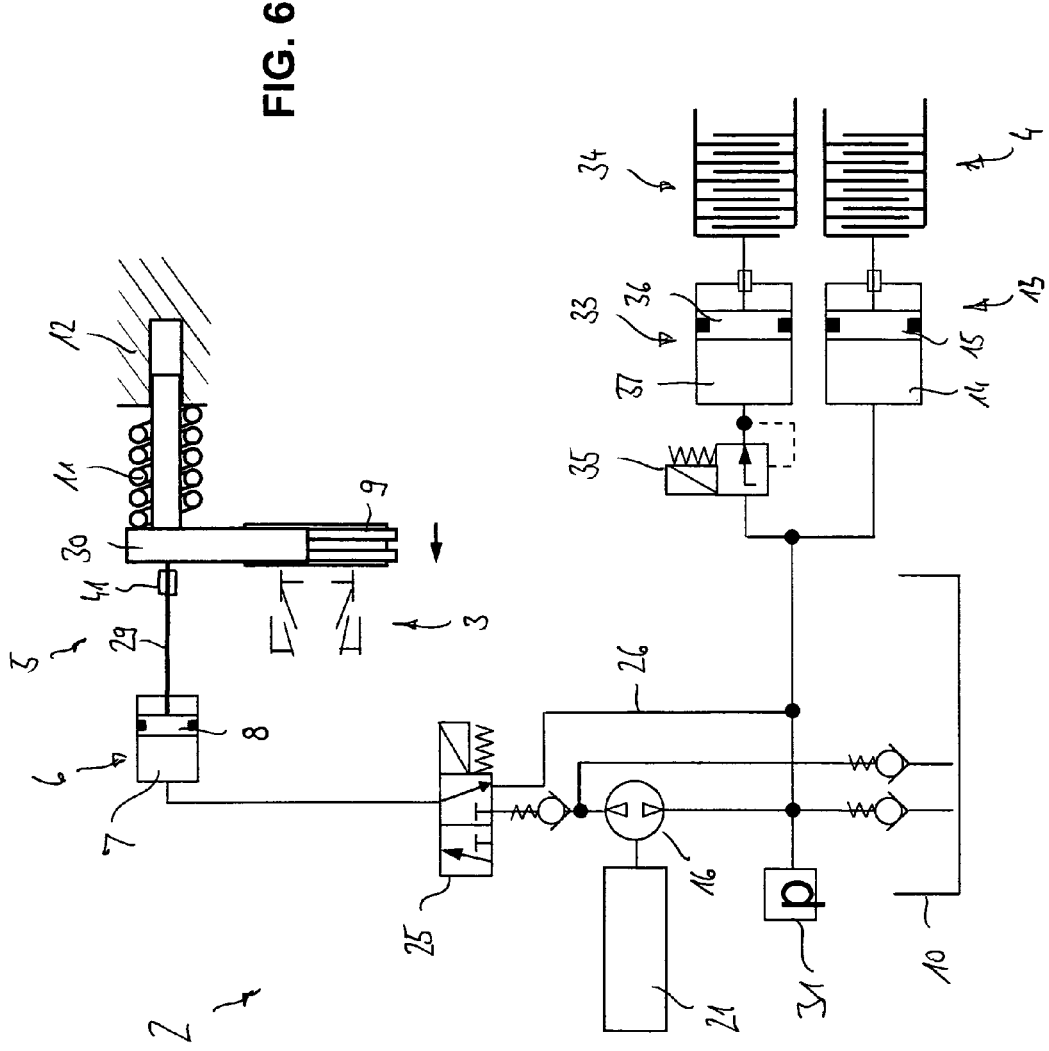
FIG. 6 shows an inventive hydraulic actuating assembly in a sixth embodiment.

FIG. 6 shows an inventive hydraulic actuating assembly in a sixth embodiment which largely corresponds to that shown in FIG. 2. To that extent, as far as common features are concerned, reference can be made to the above description, with identical components or components corresponding to one another having the same reference numbers.

The present embodiment is characterised in that in addition to the first and second actuating unit 5, 13 for actuating the first and the second coupling 3, 4, there is provided a further third hydraulic actuating unit 33 for actuating a third coupling 34. The third actuating unit 33 is arranged parallel to the second actuating unit 13. The associated third coupling 34, which is preferably provided in the form of a friction coupling, serves to lock a differential in the second driving axle. For setting the degree of locking of the third coupling 34, there is provided a third valve 35 which, more particularly, is provided in the form of a proportional valve or pressure control valve and thus permits a continuously variable loading of the third actuating unit 33. It can be seen that the third actuating unit 33 also comprises a piston-cylinder unit with a piston 36 and a cylinder chamber 37.

Control is preferably effected in such a way that after the first coupling 3 has been closed and after the second coupling 4 has been closed at least partially by relieving the pressure on the actuating unit 5, the pump 16 assumes the further pressuring process, and the pump 16 can continuously variably set the coupling moment of the second coupling 4 as a function of the driving dynamics of the motor vehicle. The locking moment at the third coupling 34 is also set continuously variably and is achieved by controlling the valve 35 accordingly.

FIGS. 7 to 10 show different embodiments of drive assemblies which can each be provided with one of the above-mentioned inventive actuating assemblies according to one of FIGS. 1 to 6. FIGS. 7 to 10 will be described jointly in respect of the characteristics which they have in common.

They diagrammatically show a drive assembly 42 for a motor vehicle driven by a plurality of axles. Of the motor vehicle, there are shown the drive unit 43, a first driveline 44 for driving a first driving axle 45 and a second driveline 46 for driving a second driving axle 47. The drive assembly 43 comprises an internal combustion engine 48, a coupling 49 and a manual gearbox 50 via which torque is introduced into the first and the second driveline 44, 46. It goes without saying that the drive unit can also be any other drive, for an example an electric motor.

For dividing the torque generated by the drive unit to the first and the second driveline 44, 46, there is provided a transfer case 52. The transfer case 52 preferably comprises a differential drive which comprises an input part and three output parts which have a differential effect relative to one another. The input part of the differential drive is provided in the form of a differential carrier 53 which is driven by the drive unit 43. For this purpose there is provided an annular gear which is connected to the differential carrier 53 in a rotationally fixed way and which engages a gear of the transmission.

Basically, the first driveline 44 is formed by the differential carrier 53 which—via differential gears which are rotatably supported in the differential carrier 53 and jointly rotate with same around the axis of rotation A—transmits the torque to the first and the second output part. The first and the second output part of the differential drive are provided in the form of sideshaft gears which engage the differential gears. The sideshaft gears are each connected in a rotationally fixed way to the associated sideshaft 54, 55 via which the introduced torque is transmitted to the associated wheels 56, 57.

The third output part is drivingly connected to the second driveline 46, wherein the second driveline can optionally be connected to the first driveline 44 for the purpose of transmitting torque to the second driving axle 47. The third output part is formed by a free end of the differential carrier 53, which free end is connected in a rotationally fixed way to an input part of the second driveline 46. The second driveline 46, in series, comprises the following assemblies which are drivingly connected to one another for transmitting torque: a first coupling 3, a first angle drive 58, a propeller shaft 59, a second angle drive 60, a second coupling 4 and a second axle differential 62 which serves to drive the second axle 47. It is understood that the above sequence of assemblies is not compulsory. For example, the first coupling in the torque flow can, in principle, also be arranged downstream the first angle drive.

The first coupling 3, which is shown only diagrammatically, comprises an input part 63 which is indirectly connected to the drive unit 43, more particularly via the differential carrier 53. Furthermore, the first coupling 3 comprises an output part 64 which can be connected and disconnected relative to the input part 63. The output part 64 is connected to the input part 65 of the angle drive 58 for introducing torque into the angle drive 58 for driving the second driving axle 47. It can be seen that the input shaft 65 of the angle drive 58 is arranged coaxially relative to the axis of rotation A around which the differential carrier 53 also rotates. The input shaft 65 is provided in the form of a hollow shaft and arranged rotatably on the sideshaft 55. The input shaft 65, in turn, is connected in a rotationally fixed way to a ring gear 66 which engages a bevel gear for rotatingly driving the propeller shaft 59. The input shaft 65 of the first angle drive 58 is rotatably supported around the axis of rotation A by first and second bearing members 67, 67'. The bearing members 67, 67' may be provided in the form of rolling contact bearings, with other bearing types such as friction bearings not being excluded.

The propeller shaft 59 which is shown only diagrammatically, may be provided in the form of a multi-component shaft which comprises a first shaft portion and a second shaft portion connected thereto in a rotationally fixed way. Depending on the length of the propeller shaft 59, it is possible to provide an intermediate joint and an intermediate bearing (not shown). It can be seen that the front shaft portion is rotatably supported by two bearing members 68, 68' and that the rear shaft portion is rotatably supported around an axis of rotation B by further bearing members 69, 69'.

The second angle drive 60 comprises a driving pinion and a ring gear as an output, engaging the pinion. The ring gear is connected in a rotationally fixed way to an input part 72 of the second coupling 4. An output part 73 of the second coupling 4 is connected in a rotationally fixed way to the differential carrier 74 of the rear axle differential 62 for transmitting torque thereto. In addition to the differential carrier 74, the rear axle differential 62 comprises differential gears which are not shown in greater detail and which, together with the differential carrier 74, rotate around the axis of rotation C, as well as two sideshaft gears which engage the differential gears and which are connected in a rotationally fixed way to the sideshaft 75, 76 of the motor vehicle. At the ends of the sideshafts 75, 76 there are rear wheels 77, 78. It can be seen that the coupling part 72 is supported by bearing members 79, 79' so as to be rotatable around the axis of rotation C, which bearing members may be provided in the form of rolling contact bearings.

A distinctive characteristic of the present drive assemblies include that, when the first and the second coupling 3, 4 are in the open position, the front angle drive 58, the propeller shaft 59 and the rear angle drive 60 can be disconnected by the first coupling 3 and the second coupling 4. In said deactivated condition, said assemblies and the associated components are standing still, thereby avoiding performance losses due to drag moments and friction. This, in turn, reduces the fuel consumption for those driving conditions in which only the first driving axle 45 is driven, with the second driving axle running in a torque-free way.

In all the embodiments shown, the first coupling 3 may be shown in the form of a switchable coupling, switchable couplings in this connection meaning couplings whose input end 63 can be separated from the output end 64. For transmitting torque, the input end 63 and the output end 64 of the switchable coupling are connected to one another in a form-locking way. As examples of switchable couplings operating in a form-locking way, dog clutches or toothed clutches are named. From the point of view of driving comfort, it is particularly advantageous to use switchable couplings wherein, prior to the switching process, the input end and the output end are synchronised relative to one another, example being synchronised locking couplings such as they are used in manual gearboxes.

The second coupling 4 may be provided in the form of force-lockingly operating friction coupling, more particularly in the form of multi-plate friction coupling. The friction coupling comprises an outer plate carrier as an input part 72 to which there are connected outer plates in a rotationally fixed and axially displaceable way, as well as an inner plate carrier as output part 73 to which there are connected inner plates in a rotationally fixed and axially displaceable way. By axially loading the plate package consisting of the outer plates and inner plates by the second actuating unit 13, the friction coupling is closed, and the rotational speeds of the input part 72 and of the output part 73 are adjusted relative to one another.

For driving conditions under which only the first driving axle 45 is to be driven, the first coupling 3 and the second coupling 4 are opened, so that all the driving components positioned in the torque flow between said two couplings 3, 4 are stationary. Under said driving conditions, performance losses due to drag moments and friction are minimised. In the case of driving conditions under which both driving axles 45, 47 are to be driven, initially the switchable coupling 3 is actuated, wherein the rotational speeds of the coupling parts 63, 64 are adjusted relative to one another first. Then, the switchable coupling 3 can be closed completely without there occurring any switching noise, so that the propeller shaft 59 is connected for the purpose of transmitting torque to the second driving axle 47. By actuating the friction coupling 4 accordingly by activation of the pump 16 acting on the second actuating unit 13, part of the torque introduced into the transfer case 52 can thus be transmitted, via the propeller shaft 59, to the friction coupling 4 and, respectively, to the rear axle 45.

In the inventive hydraulic assembly 2 which is shown only diagrammatically in FIGS. 7 to 10, the second driving axle 47 can be connected particularly quickly by making use of the stored hydraulic pre-pressure, wherein, by the pump 16 the torque to be transmitted to the second driving axle 47 can be set in a sensitive way. Below, there will follow a description of the special characteristics of the individual embodiments which, substantially, differ as regards the arrangement of the second coupling 4.

Figure 7:
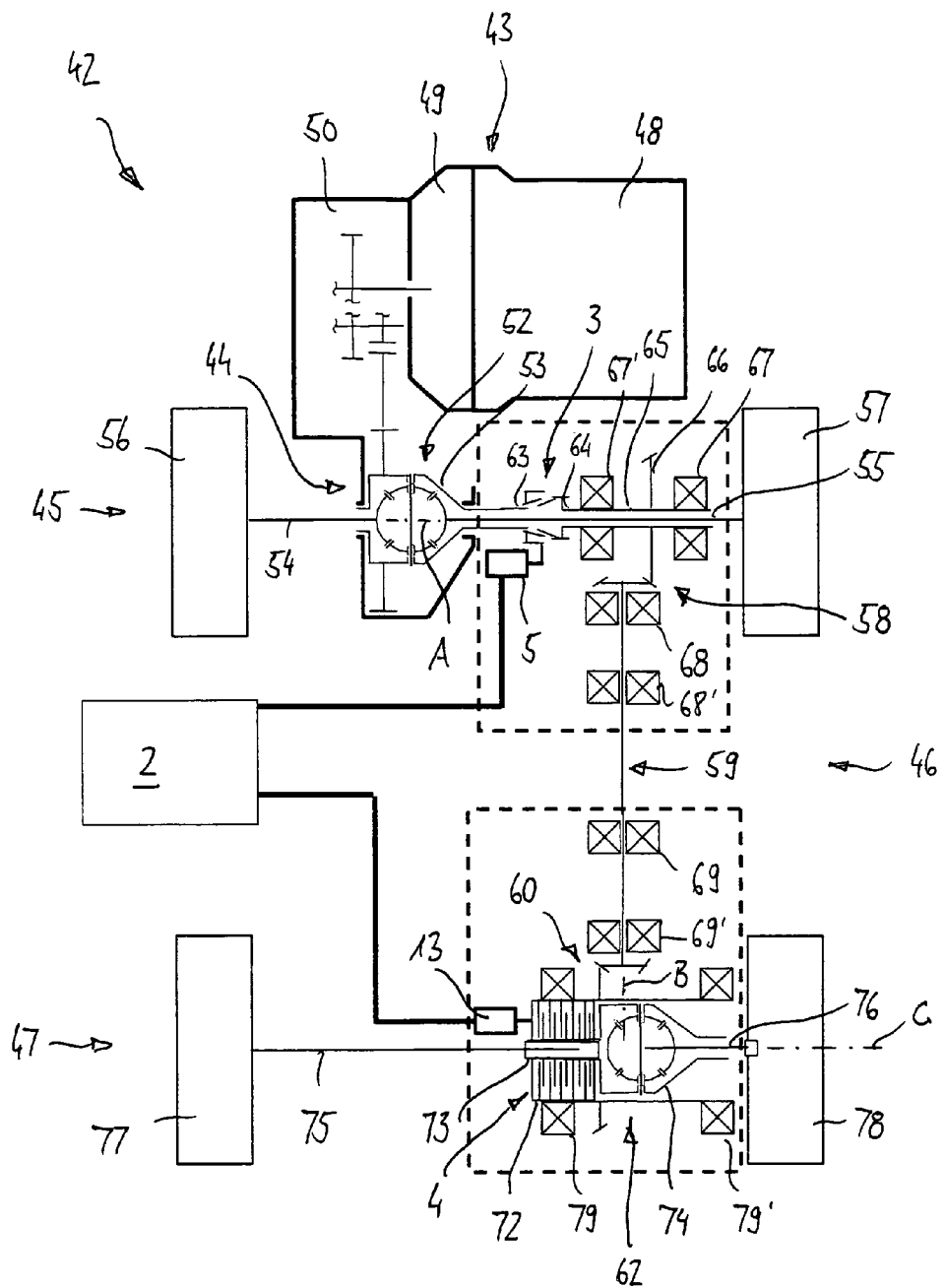
FIG. 7 shows a drive assembly with an inventive hydraulic actuating assembly according to any one of FIGS. 1 to 6 in a first embodiment.

In the embodiment according to FIG. 7, the second coupling 4 is arranged coaxially relative to the axis of rotation C of the differential drive 62. The coupling input part 72 is connected to the ring gear in a rotationally fixed way and the coupling output part 73 is connected to the differential carrier 74 in a rotationally fixed way. When the second coupling 4 is in the open position, the coupling input part 72 and the components of the second angle drive 60 are stationary, i.e. they do not carry out a rotational movement.

Figure 8:
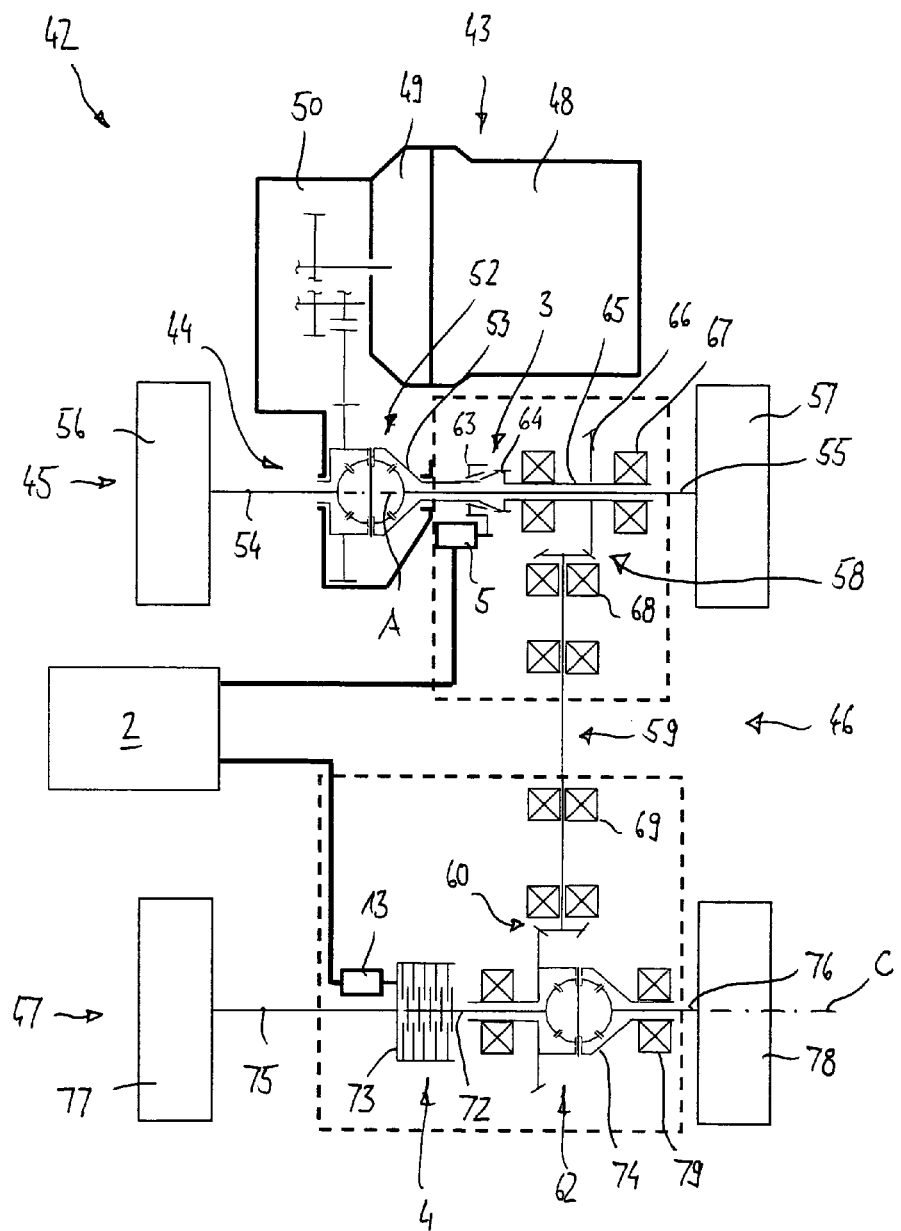
FIG. 8 shows a drive assembly with an inventive hydraulic actuating assembly according to any one of FIGS. 1 to 6 in a second embodiment.

The embodiment according to FIG. 8 is characterised in that the second coupling 4 which may be provided in the form of a friction coupling, is arranged coaxially relative to a sideshaft 75 of the second driving axle 47. The coupling input part 72 is connected to a sideshaft gear of the differential drive 62 in a rotationally fixed way. The coupling output part 73 is connected to the associated sideshaft 75 in a rotationally fixed way. When the second coupling 4 is in the open position, the two coupling parts 72, 73 rotate whereas the components of the second angle drive 60 are stationary.

Figure 9:
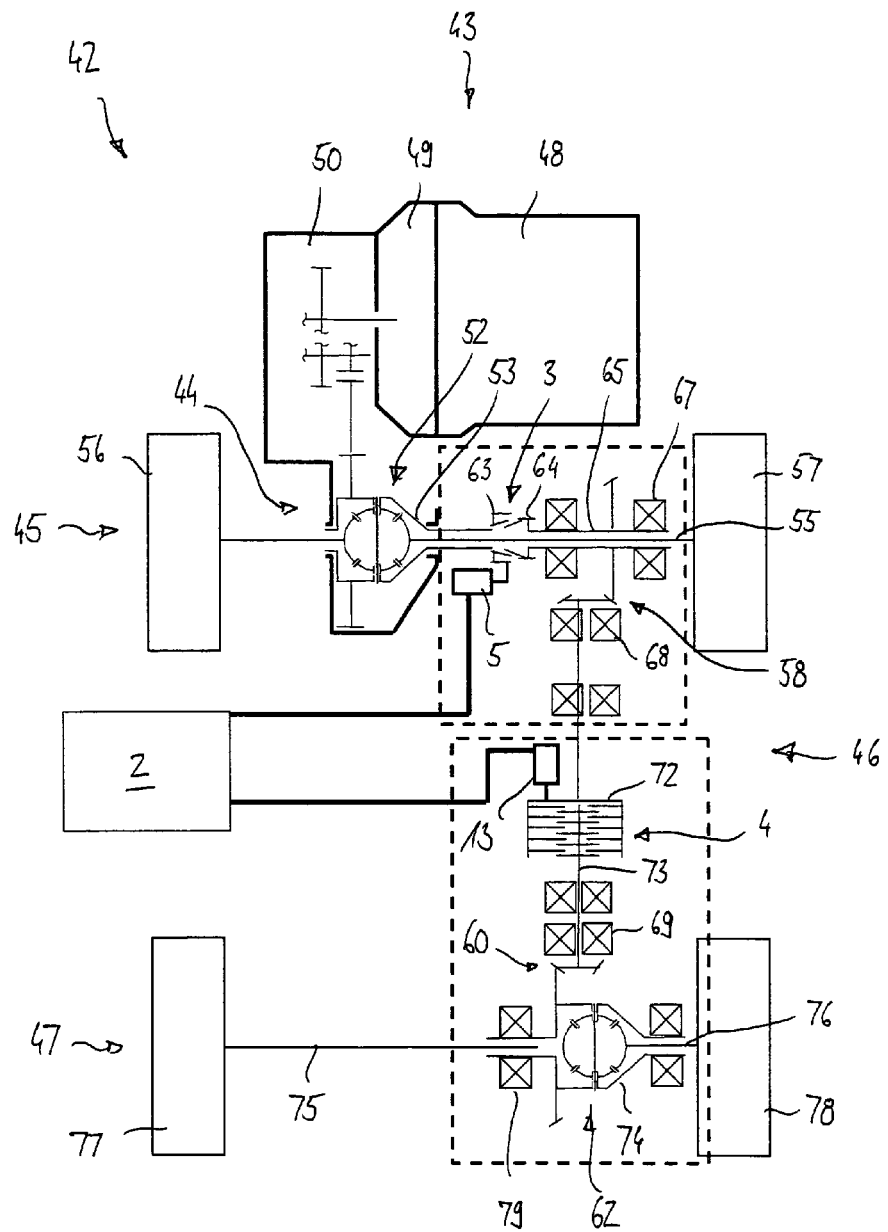
FIG. 9 shows a drive assembly with an inventive hydraulic actuating assembly according to any one of FIGS. 1 to 6 in a third embodiment.

In the embodiment according to FIG. 9, the second coupling 4 is arranged within the propeller shaft 59, for example between a first shaft portion and a second shaft portion of the propeller shaft 59. The coupling input part 72 is connected to the first shaft portion in a rotationally fixed way, whereas the coupling output part 73 is connected to the second shaft portion in a rotationally fixed way. When the second coupling 4 is in the open position, the coupling output part 73 and all the components positioned therebehind in the torque flow rotate, whereas the coupling input part 72 and all the components positioned between the latter and the first coupling 3 are stationary.

Figure 10:
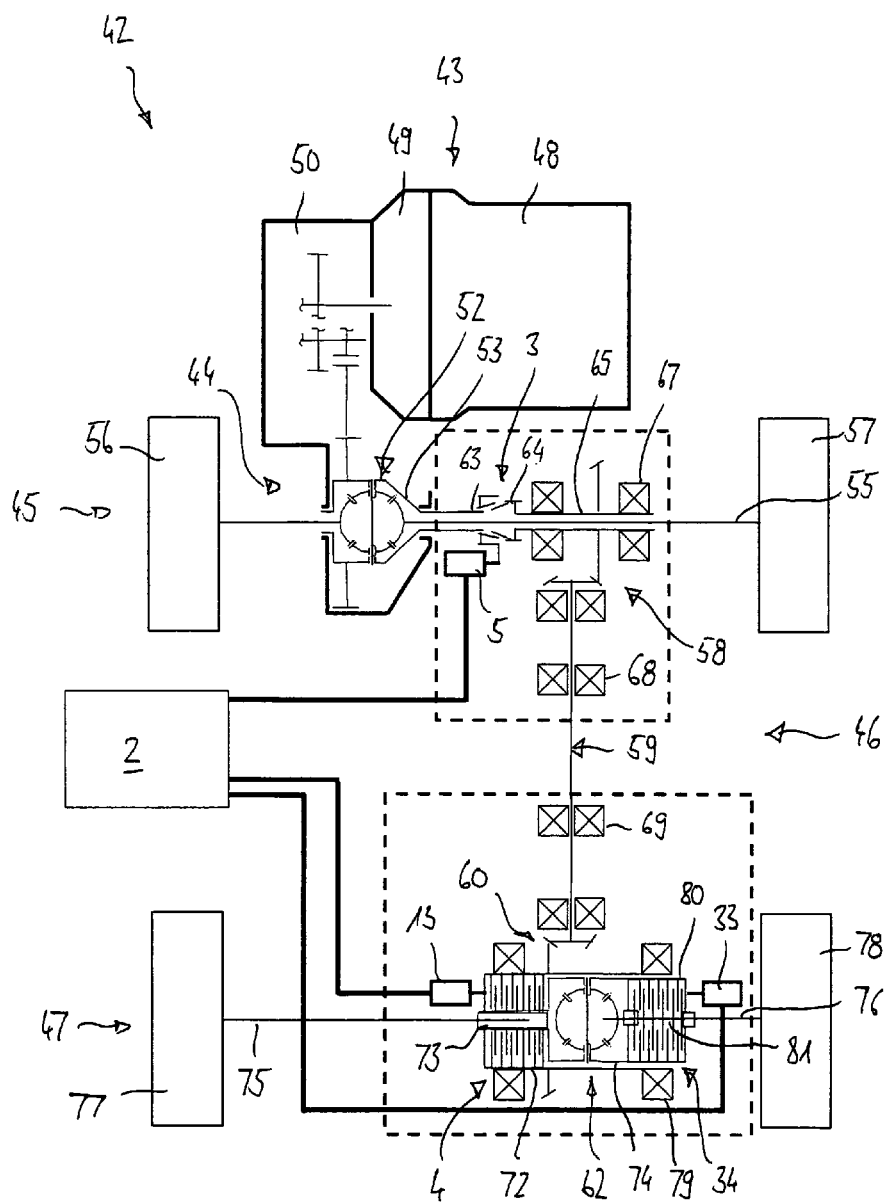
FIG. 10 shows a drive assembly with an inventive hydraulic actuating assembly according to any one of FIGS. 1 to 6 in a fourth embodiment.

FIG. 10 shows a further embodiment of an inventive drive assembly which largely corresponds to that shown in FIG. 7. To that extent, as far as common features are concerned, reference is made to the above description. A distinctive characteristic of the present drive assembly includes in that, in addition to the first and second coupling 3, 4, there is provided a third coupling 34. To that extent, the present actuating assembly 2 is designed in accordance with FIG. 6, i.e. it comprises a third actuating unit 33. The third coupling 34, which is shown only schematically, is provided in the form of a friction coupling which permits a variable setting of the locking moment. The third coupling 34 is arranged so as to be effective between the differential carrier 74 and a sideshaft 76 so that it can prevent a differential movement between the two sideshaft gears. For this purpose, a first coupling part 80 is connected to the differential carrier 74 in a rotationally fixed way, whereas the second coupling part 81 is connected to the sideshaft 76 in a rotationally fixed way. By actuating the third actuating unit 33 by means of the pump 16, there takes place a rotational speed adjustment between the sideshaft 76 and the differential carrier 74. Control is effected by the pressure control valve 35 shown in FIG. 6.

The advantage of the inventive actuating assemblies for optionally connecting a secondary driving axle to a permanently driven driving axle includes in that they permit short connecting times while, at the same time, there is ensured a sensitive control of the torque to be transmitted. The inventive drive assemblies each comprising such an actuating assembly make it possible to disconnect portions of the driveline, so that performance losses are reduced.

The invention claimed is:

1. An actuating assembly for optionally connecting a driving axle in the driveline of a motor vehicle, comprising:
   a pump for generating a hydraulic pressure;
   a first hydraulic actuating unit which can be loaded by the pump with a hydraulic pressure against a counter force, wherein in a hydraulically loaded condition the first hydraulic actuating unit forms a pressure accumulator in which a pre-pressure is stored, by which pre-pressure a first coupling in the driveline of the motor vehicle is held in an open position wherein the first coupling is closed in a hydraulically unloaded condition of the first hydraulic actuating unit;
   a second hydraulic actuating unit which can be loaded with the pre-pressure stored in the first hydraulic actuating unit and which can also be loaded by the pump with hydraulic pressure, wherein by loading the second hydraulic actuating unit, a second coupling in the driveline of the motor vehicle is closed for transmitting torque.

2. An actuating assembly according to claim 1, wherein the first hydraulic actuating unit and the second hydraulic actuating are connected to one another via a connecting channel, wherein in the connecting channel there is provided at least one valve for opening and closing the connecting channel, wherein, by opening the at least one valve, hydraulic fluid is conveyed from the first hydraulic actuating unit to the second hydraulic actuating unit.

3. An actuating assembly according to claim 1, wherein there is provided a first valve which is a multi-way valve and which is arranged between the pump and the first hydraulic actuating unit, as well as a return valve which is arranged upstream of the first valve.

4. An actuating assembly according to claim 1, wherein there is provided a first valve which is arranged between the pump and the first hydraulic actuating unit, as well as a second valve which is arranged between the pump and the second hydraulic actuating unit.

5. An actuating assembly according to claim 1, wherein when the pump is actuated in a first conveying direction, the first hydraulic actuating unit can be loaded; and
   that, when actuating the pump in an opposite second conveying direction, the second hydraulic actuating unit can be loaded, wherein the first hydraulic actuating unit is unloaded.

6. An actuating assembly according to claim 5, wherein, when actuating the pump in the first conveying direction, the second hydraulic actuating unit is unloaded or is emptied in the opening direction of the second coupling.

7. An actuating assembly according claim 1, wherein the first and the second hydraulic actuating unit are designed such that, with a maximum volume flow conveyable from the first hydraulic actuating unit to the second hydraulic actuating unit, a clearance of the second coupling can at least largely be bridged.

8. An actuating assembly according to claim 7, configured to generate a maximum actuating stroke at the second hydraulic actuating unit by emptying the first hydraulic actuating unit, wherein the maximum actuating stroke is configured to at least approach the clearance of the second coupling.

9. An actuating assembly according to claim 1, wherein the first hydraulic actuating unit comprises a piston-cylinder unit and a first spring which loads a piston of the piston-cylinder unit against the pressure force of the pump so that the first hydraulic actuating unit has a pressure accumulating function.

10. An actuating assembly according to claim 9, wherein, the first coupling can be loaded by the first spring for transmitting torque and is opened by generating a hydraulic pressure against the force of the first spring in the first hydraulic actuating unit.

11. An actuating assembly according to claim 9, wherein the first hydraulic actuating unit comprises a second spring which loads the piston of the piston-cylinder unit against the pressure force of the pump and which is switched in parallel with the first spring.

12. An actuating assembly according to claim 9, wherein the first hydraulic actuating unit comprises a second spring which loads the piston of the piston cylinder unit against the pressure force of the pump and which is connected in series to the first spring.

13. An actuating assembly according to claim 1, wherein there is provided a third hydraulic actuating unit for actuating a third coupling, wherein the third hydraulic actuating unit is controlled via a third valve.

14. An actuating assembly according to claim 1, wherein the first coupling is provided in form of a locking coupling, wherein the locking coupling can be operated between an open position in which no torque is transmitted and a closed position in which a full amount of torque is transmitted.

15. An actuating assembly according to claim 1, wherein the second coupling is provided in the form of a friction coupling, wherein the torque transmissible by the friction coupling can be variably controlled by the pump.

16. A drive assembly for a motor vehicle with a permanently driven first driving axle and an optionally driveable second driving axle, wherein a driveline for driving the second driving axle comprises a first coupling and a second coupling, wherein, for actuating the first and the second coupling, there is provided an actuating assembly according to claim 1.

17. A drive assembly according to claim 16, wherein the permanently driven driving axle comprises the front axle, and wherein the optionally driveable driving axle comprises the rear axle of the motor vehicle.

18. A drive assembly according to claim 16, wherein the second coupling is arranged coaxially relative to an axis of rotation of a rear axle differential in a torque flow between a rear angle drive and the rear axle differential.

19. A drive assembly according to claim 16, wherein the second coupling is arranged in a sideshaft in a torque flow between a rear axle differential and a wheel.

20. A drive assembly according to claim 16, wherein the second coupling is arranged coaxially relative to a propeller shaft of the motor vehicle.

21. A drive assembly according to claim 16, wherein the first coupling is arranged in a torque flow between a front axle differential and a front angle drive.

22. A method of connecting a driving axle in the driveline of a motor vehicle by the actuating assembly of claim 1, the method comprising:
    filling the pressure accumulator with hydraulic fluid by the pump, wherein the pre-pressure is generated, and
    at least partially emptying the pressure accumulator, wherein the first coupling is completely closed for transmitting torque and the second coupling is at least partially closed.

23. The method of claim 22, wherein, after the pressure accumulator has been completely emptied, the second hydraulic actuating unit can be loaded with hydraulic pressure by the pump, for actuating the second coupling.

24. The method of claim 22, wherein the pump operates bidirectionally, wherein filling the pressure accumulator takes place by actuating the pump in a first conveying direction and wherein loading the second hydraulic actuating unit takes place by actuating the pump in an opposed second conveying direction.

25. The method of claim 22, wherein the first actuating unit forms the pressure accumulator, wherein, by hydraulically loading the first actuating unit by the pump, the first coupling is opened against a spring force.

* * * * *

UNITED STATES PATENT AND TRADEMARK OFFICE
CERTIFICATE OF CORRECTION

PATENT NO. : 8,739,953 B2  
APPLICATION NO. : 13/145069  
DATED : June 3, 2014  
INVENTOR(S) : Theodor Gassmann et al.

Page 1 of 1

It is certified that error appears in the above-identified patent and that said Letters Patent is hereby corrected as shown below:

In the Claims

Column 16, claim 1, line 20, replace "in an open position wherein the first coupling is closed in" with -- in an open position, wherein the first coupling is closed in --.

Signed and Sealed this  
Eleventh Day of November, 2014

Michelle K. Lee  
*Deputy Director of the United States Patent and Trademark Office*